(12) United States Patent
Khlat (10) Patent No.: US 7,668,249 B1
(45) Date of Patent: Feb. 23, 2010

(54) OVERSAMPLING RATE CONVERTER WITH TIMING CONTROL FOR A DIGITAL RADIO FREQUENCY TRANSMITTER MODULATOR

(75) Inventor: Nadim Khlat, Midi-Pyrenees (FR)

(73) Assignee: RF Micro Devices, Inc., Greensboro, NC (US)

( * ) Notice: Subject to any disclaimer, the term of this patent is extended or adjusted under 35 U.S.C. 154(b) by 580 days.

(21) Appl. No.: 11/459,812

(22) Filed: Jul. 25, 2006

(51) Int. Cl.
*H04L 5/12* (2006.01)
*H04L 23/02* (2006.01)

(52) U.S. Cl. .................. 375/261; 375/298; 375/373; 375/355; 332/149; 455/108; 455/109

(58) Field of Classification Search .................. 375/371, 375/355, 354, 373, 261, 298; 455/108, 109; 332/149
See application file for complete search history.

(56) References Cited

U.S. PATENT DOCUMENTS

| | | | |
|---|---|---|---|
| 6,144,712 A * | 11/2000 | Samueli et al. | ............. 375/371 |
| 6,366,177 B1 | 4/2002 | McCune et al. | |
| 6,377,784 B2 | 4/2002 | McCune | |
| 7,010,276 B2 | 3/2006 | Sander et al. | |
| 7,158,494 B2 | 1/2007 | Sander et al. | |

* cited by examiner

*Primary Examiner*—Phuong Phu
(74) *Attorney, Agent, or Firm*—Withrow & Terranova, P.L.L.C.

(57) ABSTRACT

The present invention includes a digital quadrature rate converter and an oversampling interpolator, which are used to receive digital quadrature modulation data at one clock rate and to provide oversampled digital quadrature modulation data at a higher clock rate. Rate conversion and oversampled interpolation are used to accommodate systems with multiple clock frequencies and to generate modulation signals with low distortion. Some embodiments of the present invention add timing control to the oversampled interpolation. Some embodiments of the present invention may combine the rate conversion, oversampled interpolation, and timing control operations into a single digital circuit.

18 Claims, 9 Drawing Sheets

OVERSAMPLING RATE CONVERTER WITH TIMING CONTROL FOR A DIGITAL RADIO FREQUENCY TRANSMITTER MODULATOR

FIELD OF THE INVENTION

The present invention relates to digital modulators, which are used in radio frequency (RF) transmitters as part of wireless communications systems.

BACKGROUND OF THE INVENTION

With the growth of the wireless communications industry, wireless communications protocols become more sophisticated and demanding in their requirements for complex modulation schemes and narrow channel bandwidths. One such communications protocol is wideband code division multiple access (WBCDMA), which requires modulation signals with square-root raised cosine (SRRC) pulse shapes. To provide complex modulation signals, digital modulation methods may be necessary.

Wireless RF transmitters generally need to provide stable output power with minimal distortion under varying antenna loading and environmental conditions. A quadrature-based transmitter architecture is one way to provide stable output power under varying conditions. A quadrature-based architecture uses an in-phase signal path and a quadrature-phase signal path, which are phase shifted and combined to form an RF output signal.

Quadrature RF transmitters with low distortion, digital quadrature modulation may be optimal for some communications systems. Some quadrature RF transmitters utilize modulation data that is provided at one data rate; however, system clock constraints may require modulation data at a different clock rate for digital filtering and other processing of the modulation data. For example, in a multi-mode universal mobile telecommunications system (UMTS) transmitter, enhanced data rates for global system for mobile communications (GSM) evolution (EDGE) transmissions use a symbol rate of 270.833 khz, which is a sub-multiple of 26 Mhz; however, WBCDMA transmitters use a chip rate of 3.84 Mhz, which is not a sub-multiple of 26 Mhz; therefore, some form of rate conversion is required. A chip is a bit that is sent in a spread spectrum communications algorithm. Several chips may be required for each bit of information to be sent. Chip rate refers to the number of chips per second that are sent in a spread spectrum communications algorithm. To rate convert modulation data, some kind of interpolation algorithm must be used to take input modulation samples at one data rate and calculate the proper values for output modulation samples to be provided at a different data rate. During the rate conversion and interpolation process, distortion of modulation information must be minimized.

Some communications systems require adjustments to the timing of reply transmissions relative to the timing of received information. Such adjustments are part of a feature called timing control and are referred to as timing advance/delay. For example, WBCDMA systems may require timing advance/delay in ¼ chip increments.

SUMMARY OF THE INVENTION

The present invention includes a digital quadrature rate converter and an oversampling interpolator, which are used to receive digital quadrature modulation data at one clock rate and provide oversampled digital quadrature modulation data at a higher clock rate. Rate conversion and oversampled interpolation are used to accommodate systems with multiple clock frequencies and to generate modulation signals with low distortion. Some embodiments of the present invention add timing control to the oversampled interpolation. Some embodiments of the present invention may combine the rate conversion, oversampled interpolation, and timing control operations into a single digital circuit.

Some embodiments of the present invention may include a fractional hold function to change the duty cycle of the oversampled digital quadrature modulation data. The fractional hold function may be used to simplify interpolation algorithms, to reduce the operating frequency of oversampling interpolation circuitry, or both. For embodiments of the present invention including a fractional hold function, the rate conversion, interpolation, timing control, and fractional hold functions may be combined into one or more digital circuits.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention includes a digital quadrature rate converter and oversampling interpolator, which are used to receive digital quadrature modulation data at one clock rate and provide oversampled digital quadrature modulation data at a higher clock rate. Rate conversion and oversampled interpolation are used to accommodate systems with multiple clock frequencies and to generate modulation signals with low distortion. Some embodiments of the present invention add timing control to the oversampled interpolation. Some embodiments of the present invention may combine the rate conversion, oversampled interpolation, and timing control operations into a single digital circuit.

Some embodiments of the present invention may include a fractional hold function to change the duty cycle of the oversampled digital quadrature modulation data. The fractional hold function may be used to simplify interpolation algorithms, to reduce the operating frequency of oversampling interpolation circuitry, or both. For embodiments of the present invention that including a fractional hold function, the rate conversion, interpolation, timing control, and fractional hold functions may be combined into one or more digital circuits.

Figure 1:
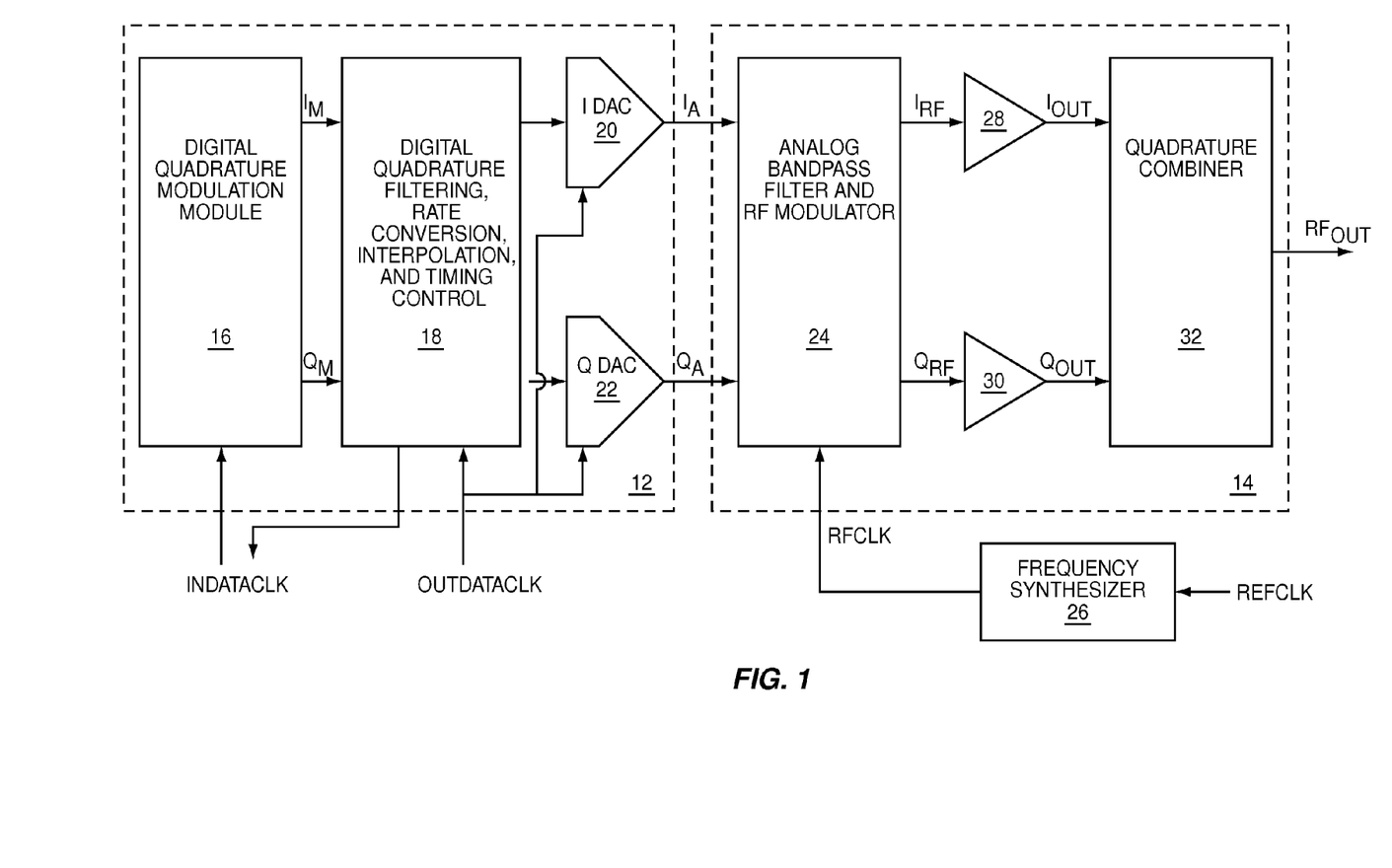
FIG. 1 shows a digital quadrature RF transmitter according to one embodiment of the present invention.

A digital quadrature RF transmitter 10 is shown in FIG. 1, including a digital section 12 and an analog section 14. A digital quadrature modulation module 16 provides input in-phase digital modulation data $I_M$ and input quadrature-phase digital modulation data $Q_M$ to a digital quadrature filtering, rate conversion, interpolation, and timing control section 18. The input digital modulation data $I_M$, $Q_M$ are provided at an input data clock rate INDATACLK. The digital quadrature filtering, rate conversion, interpolation, and timing control section 18 digitally filters, if necessary, and rate converts the input digital modulation data $I_M$, $Q_M$ into output digital modulation data, which are clocked into an in-phase digital-to-analog converter (IDAC) 20 and a quadrature-phase digital-to-analog converter (QDAC) 22. The output digital modulation data are provided at an output data clock rate OUTDATACLK.

The digital-to-analog converters 20, 22 clock in the output digital modulation data with OUTDATACLK and convert the output digital modulation data into analog modulation signals, including an in-phase analog modulation signal $I_A$ and a quadrature-phase analog modulation signal $Q_A$. $I_A$ and $Q_A$ are received by an analog bandpass filter and RF modulator 24, which receives an RF input signal RFCLK and provides a modulated in-phase RF signal $I_{RF}$ and a modulated quadrature-phase RF signal $Q_{RF}$. The RF input signal RFCLK is provided by a frequency synthesizer 26, which uses a reference clock REFCLK to synthesize RFCLK.

An in-phase RF power amplifier 28 receives $I_{RF}$ and provides an amplified in-phase RF output signal $I_{OUT}$. A quadrature-phase RF power amplifier 30 receives $Q_{RF}$ and provides an amplified quadrature-phase RF output signal $Q_{OUT}$. $I_{OUT}$ and $Q_{OUT}$ are received by a quadrature combiner 32 to provide a transmitter RF output signal $RF_{OUT}$ from the digital quadrature RF transmitter 10.

Figure 2:
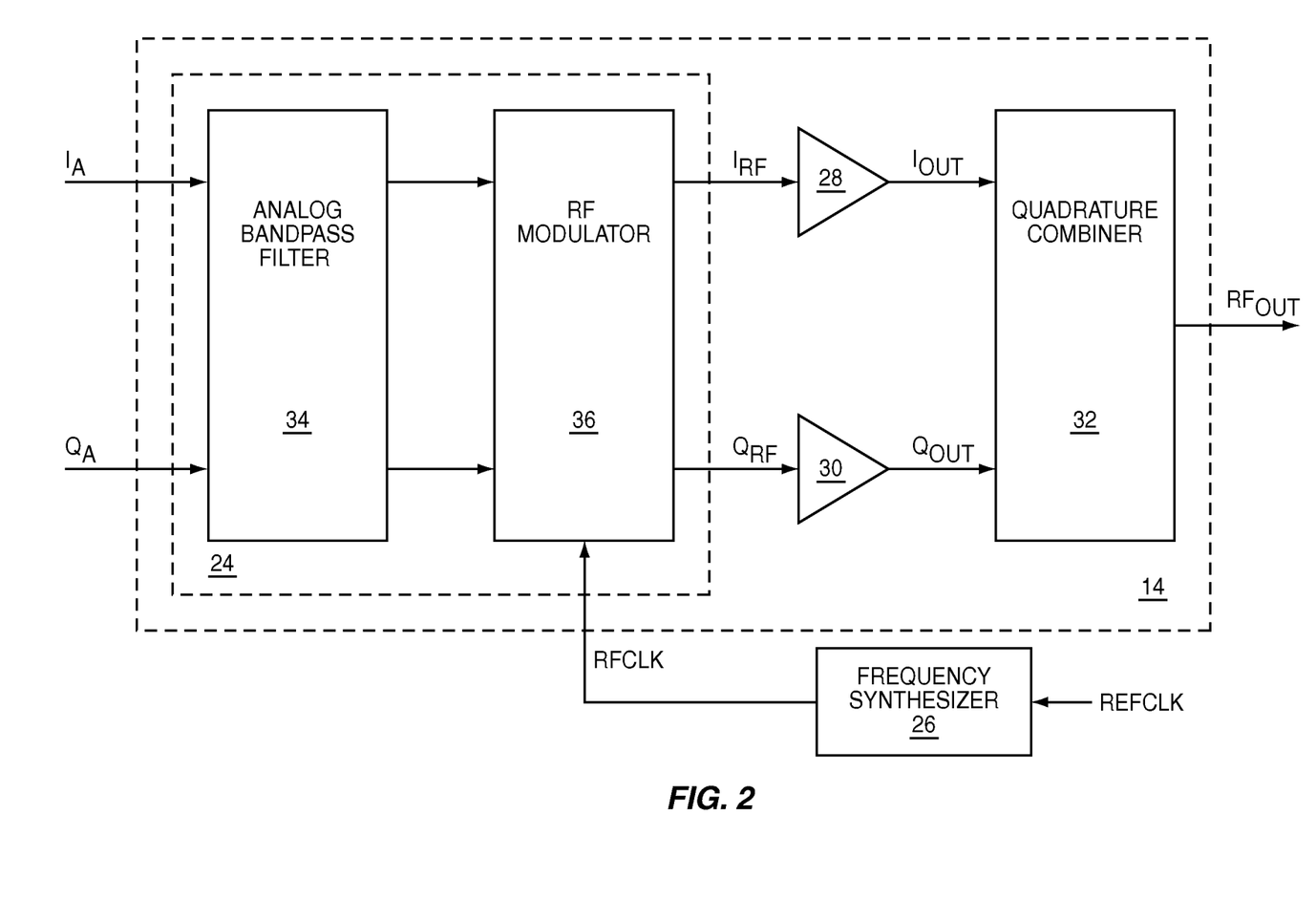
FIG. 2 shows details of the analog section of the digital quadrature RF transmitter of FIG. 1.

Details of the analog section 14 are shown in FIG. 2. The analog bandpass filter and RF modulator 24 includes an analog bandpass filter 34, which receives $I_A$ and $Q_A$ and filters out any signals that fall outside the modulation frequency band, particularly quantization noise introduced by the analog-to-digital converters 20, 22. A quadrature RF modulator 36 receives filtered analog modulation signals from the analog bypass filter 34 and uses RFCLK to generate the modulated quadrature RF signals $I_{RF}$ and $Q_{RF}$. Some embodiments of the present invention may use lowpass filtering in place of the analog bandpass filter 34.

Figure 3:
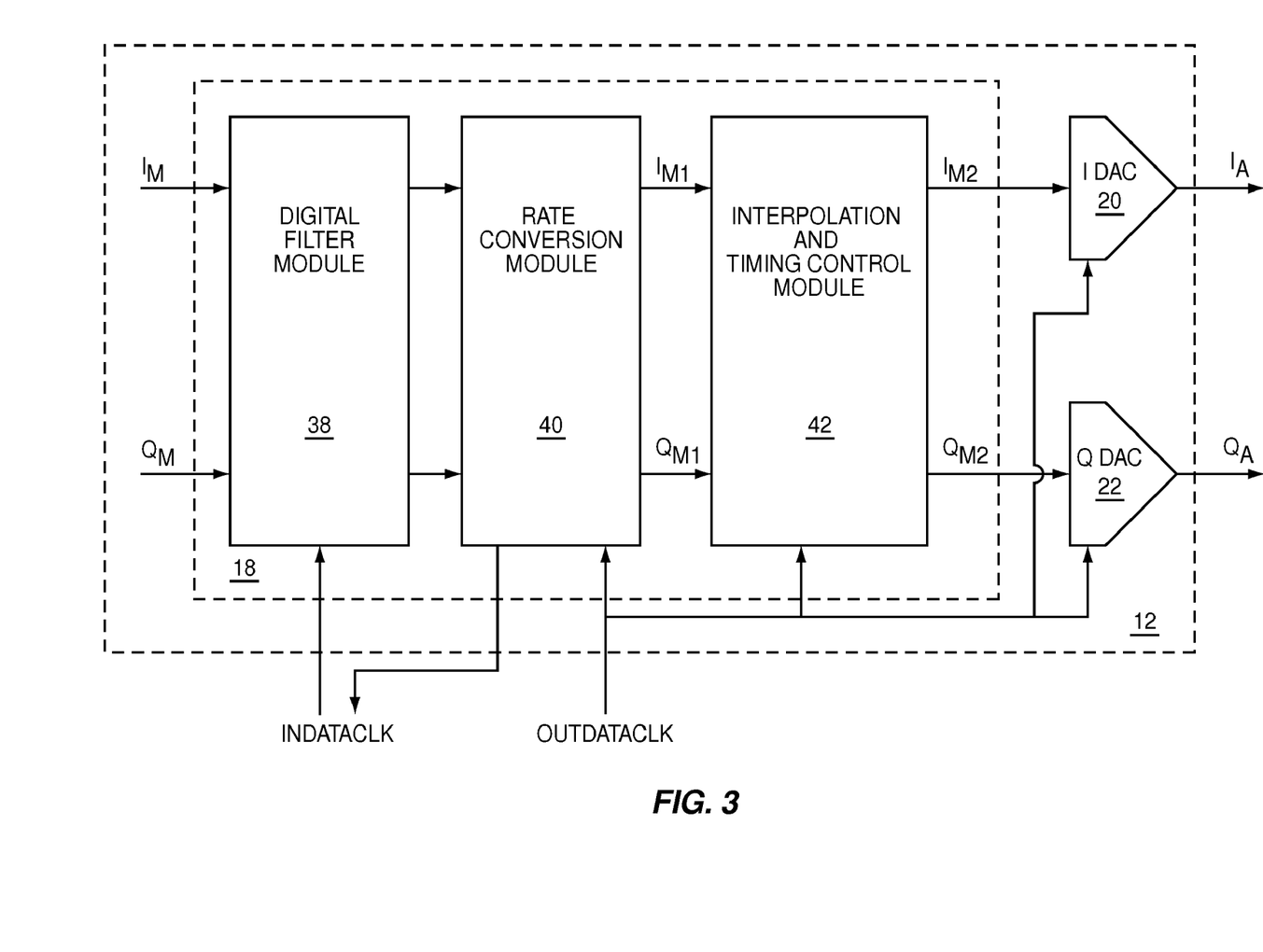
FIG. 3 shows details of the digital section of the digital quadrature RF transmitter of FIG. 1.

Details of the digital section 12 are shown in FIG. 3. The digital quadrature filtering, rate conversion, interpolation, and timing control section 18 may include a digital filter module 38 to condition the digital modulation data. In WBCDMA applications, the digital filter module 38 may be used to help create an SRRC pulse shape to the modulation signal. A finite impulse response (FIR) digital filter may be used since such filters can be designed to preserve the integrity of phase information contained in the modulation data. The digital filter module 38 may operate at some integer multiple of INDATACLK.

A rate conversion module 40 receives filtered digital quadrature modulation data from the digital filter module 38 at the input data clock rate INDATACLK and provides the same information to an interpolation and timing control module 42 at the output data clock rate OUTDATACLK. The filtered digital in-phase modulation data received by the rate conversion module 40 is used to create rate converted digital in-phase modulation data $I_{M1}$. The filtered digital quadrature-phase modulation data received by the rate conversion module 40 is used to create rate converted digital quadrature-phase modulation data $Q_{M1}$. The interpolation and timing control module 42 receives the rate converted digital modulation data $I_{M1}$, $Q_{M1}$, ignoring any repeated data samples, and determines interpolation values to create interpolated digital in-phase modulation data $I_{M2}$ and interpolated digital quadrature-phase modulation data $Q_{M2}$, which are then provided to the analog-to-digital converters 20, 22.

Figure 4A:
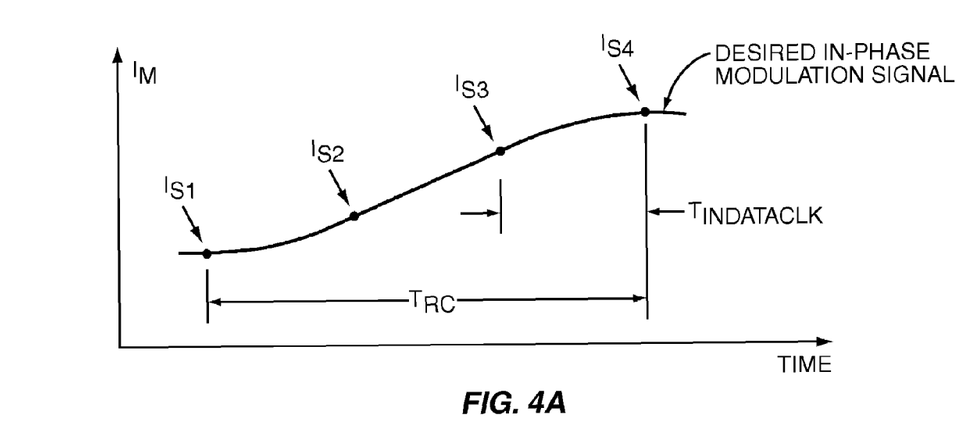
FIGS. 4A and 4B show how modulation data is rate converted to be ready for interpolation.
Figure 4B:
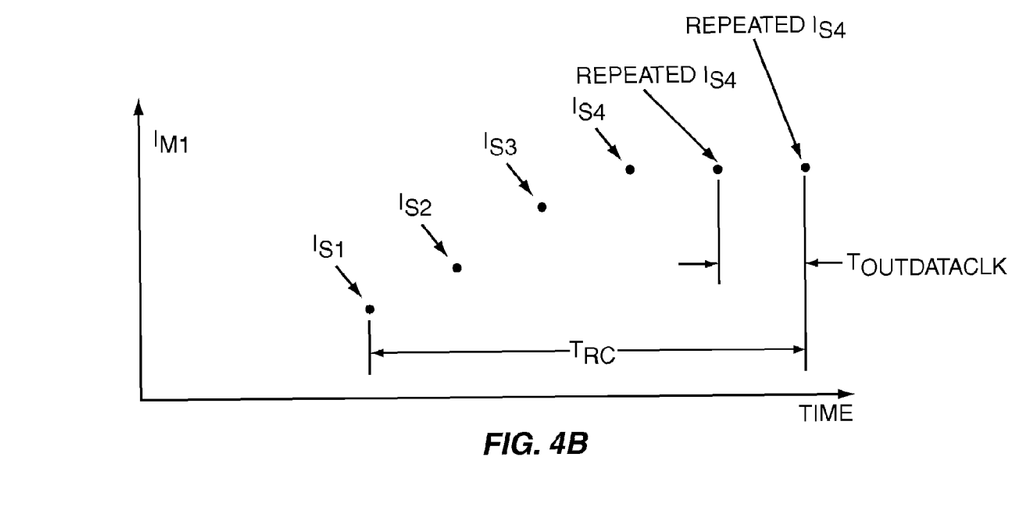

FIG. 4 illustrates the rate conversion process for the filtered digital in-phase modulation data. In this example, the ratio of OUTDATACLK to INDATACLK is 5/3; therefore, for every three input data samples received by the rate conversion module 40, five output data samples must be provided. Ignoring the effects of the digital filter module 38, the input in-phase digital modulation data $I_M$ is shown in FIG. 4A as data samples $I_{S1}$ through $I_{S4}$. These data samples are representative of the desired in-phase modulation signal and are clocked in with INDATACLK, which has a period of $T_{INDATACLK}$. The rate converted digital in-phase modulation data $I_{M1}$ is shown in FIG. 4B. Data samples $I_{s1}$ through $I_{s4}$ and two repeated $I_{S4}$ data samples are clocked out with OUTDATACLK, which has a period of $T_{OUTDATACLK}$. A rate conversion period $T_{RC}$ is determined by the smallest whole number of $T_{INDATACLK}$ periods that are equal in time to a whole number of $T_{OUTDATACLK}$ periods.

Figure 5A:
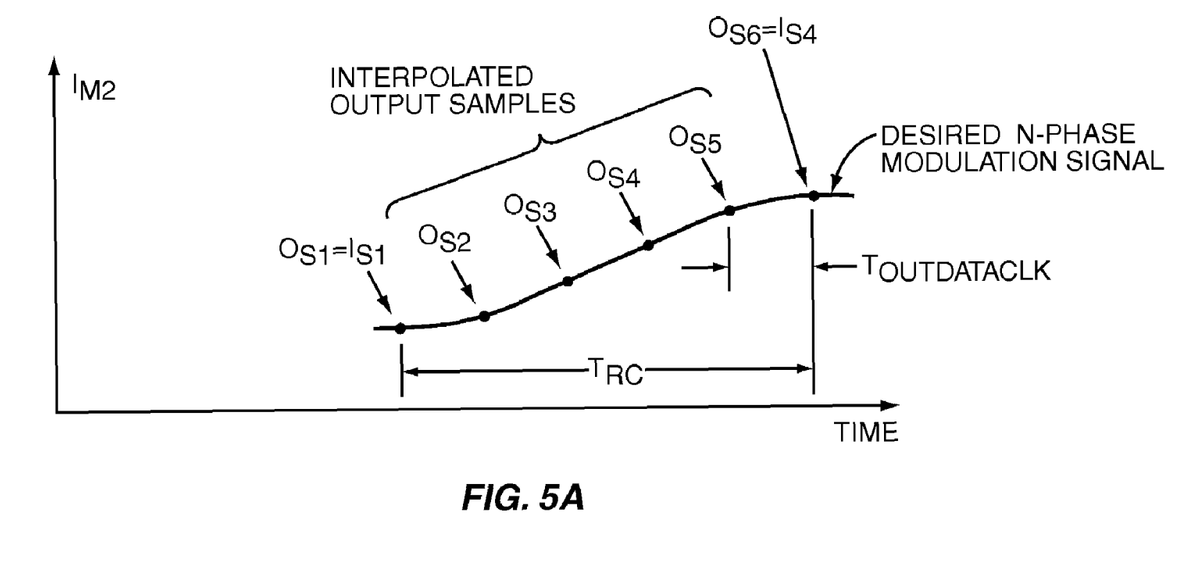
FIG. 5 shows how the rate converted modulation data of FIG. 4 is then interpolated and how it appears after digital-to-analog conversion.
Figure 5B:
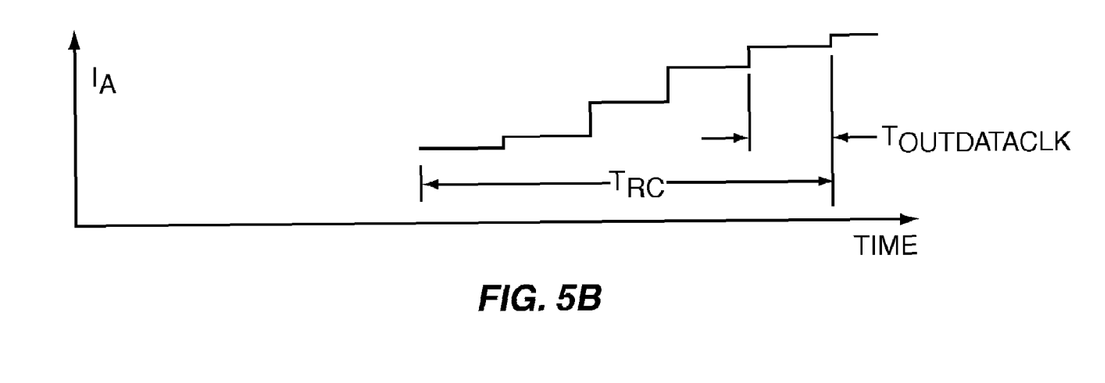

FIGS. 5A and 5B show the output data samples for the interpolated digital in-phase modulation data $I_{M2}$. As in FIGS. 4A and 4B, the ratio of OUTDATACLK to INDATACLK is 5/3; therefore, every third input data sample can be used directly as an output data sample; however, the remaining four output data samples must be interpolated. FIG. 5A shows output data samples $O_{S1}$ through $O_{S6}$. $O_{S1}$ and $O_{S6}$ use the same values as $I_{S1}$ and $I_{S4}$, respectively The values of $O_{S2}$ through $O_{S5}$ must be determined from the values of $I_{S1}$ through $I_{S4}$ using an interpolation method. In the present invention, any interpolation method may be used, including fitting the modulation data to a polynomial, called polynomial curve fitting, which uses the input data samples to create polynomial coefficients and then uses the resulting polynomial to create the output data samples. A new set of output data samples are created from a new set of input data samples every rate conversion period $T_{RC}$. FIG. 5B shows the in-phase analog modulation signal $I_A$ without oversampling. For those systems requiring timing control, interpolation methods that easily support timing adjustments as part of the interpolation process may be used. Some FIR filters can provide timing control in conjunction with interpolation.

INDATACLK and OUTDATACLK may be derived from two separate clock sources. If the ratio of OUTDATACLK to INDATACLK is greater than or equal to two, the interpolation is said to be oversampled. In the present invention, the ratio of OUTDATACLK to INDATACLK is greater than or equal to two, which exhibits lower distortion than non-oversampled interpolation techniques.

Figure 6A:
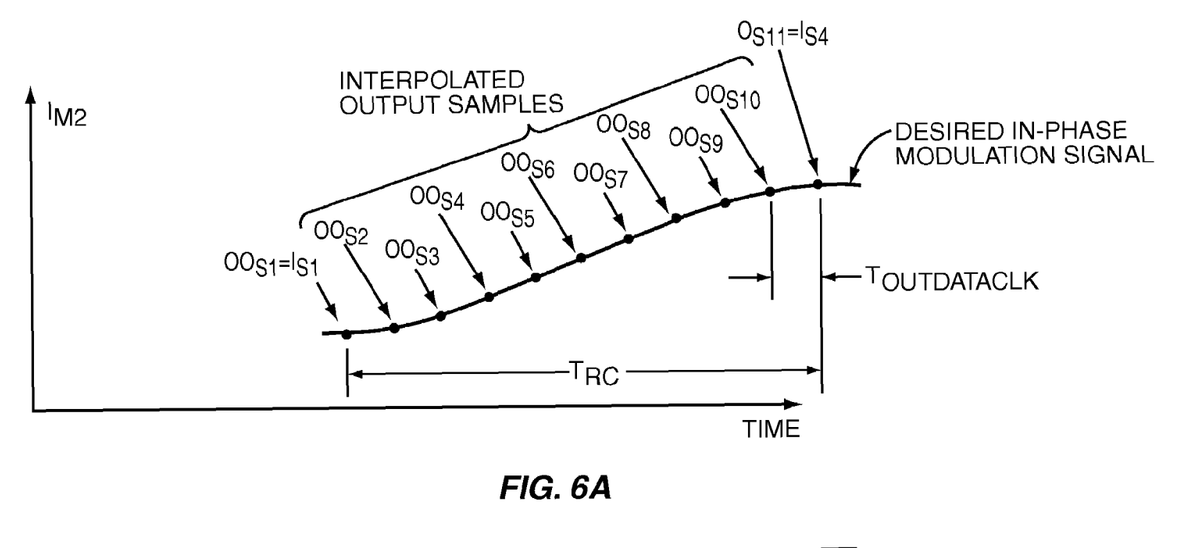
FIG. 6 shows how the present invention is used to take the rate converted modulation data of FIG. 4 to create oversampled interpolated modulation data and how it appears after digital-to-analog conversion.
Figure 6B:
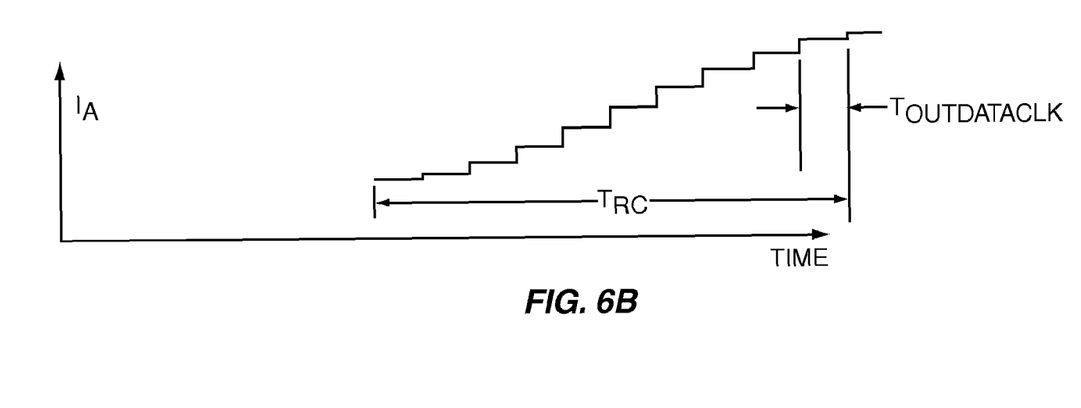

FIGS. 6A and 6B illustrate the benefits of oversampling. In this example, the ratio of OUTDATACLK to INDATACLK is increased from 5/3 to 10/3; therefore, every third input data sample can be used as an output data sample. The remaining nine output data samples must be interpolated. FIG. 6A shows oversampled output data samples $OO_{S1}$ through $OO_{S11}$. $OO_{S1}$ and $OO_{S11}$ use the same values as $I_{S1}$ and $I_{S4}$. The values of $OO_{S2}$ through $OO_{S10}$ must be determined from the values of $I_{S1}$ through $I_{S4}$ using an interpolation method.

FIG. 5B shows the in-phase analog modulation signal $I_A$ without oversampling. FIG. 6B shows the in-phase analog modulation signal $I_A$ with oversampling, which is smoother with reduced distortion and noise when compared with the in-phase analog modulation signal $I_A$ without oversampling. Some applications, such as WBCDMA, may require reduced distortion and noise.

Figure 7:
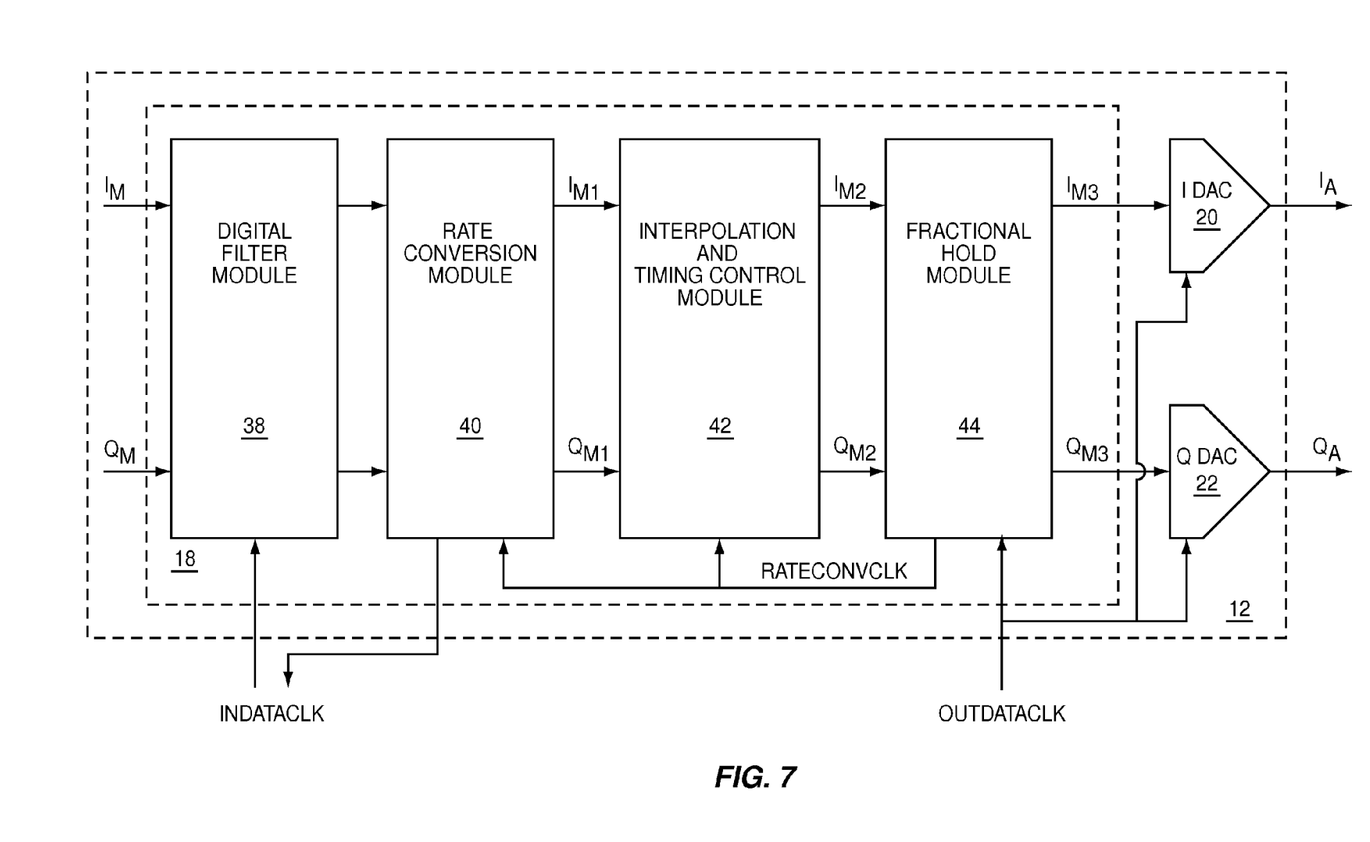
FIG. 7 adds a fractional hold module to the digital section of FIG. 3.

Some embodiments of the present invention may augment the interpolation function with a fractional hold module 44 as shown in FIG. 7. The fractional hold module 44 receives interpolated digital quadrature modulation data $I_{M2}$, $Q_{M2}$ and then holds the data for an alternating number of OUTDATACLK cycles to create fractionally held digital in-phase modulation data $I_{M3}$ and fractionally held digital quadrature-phase modulation data $Q_{M3}$, which are then provided to the analog-to-digital converters 20, 22.

The fractional hold module 44 receives OUTDATACLK, which is used to create a rate converter clock RATECONVCLK that is lower in frequency than OUTDATACLK, thereby allowing the rate conversion module 40 and interpolation and timing control module 42 to operate at a lower clock frequency than other architectures. Therefore, the fractional hold module 44 may provide oversampling functionality with reduced power consumption.

Figure 8:
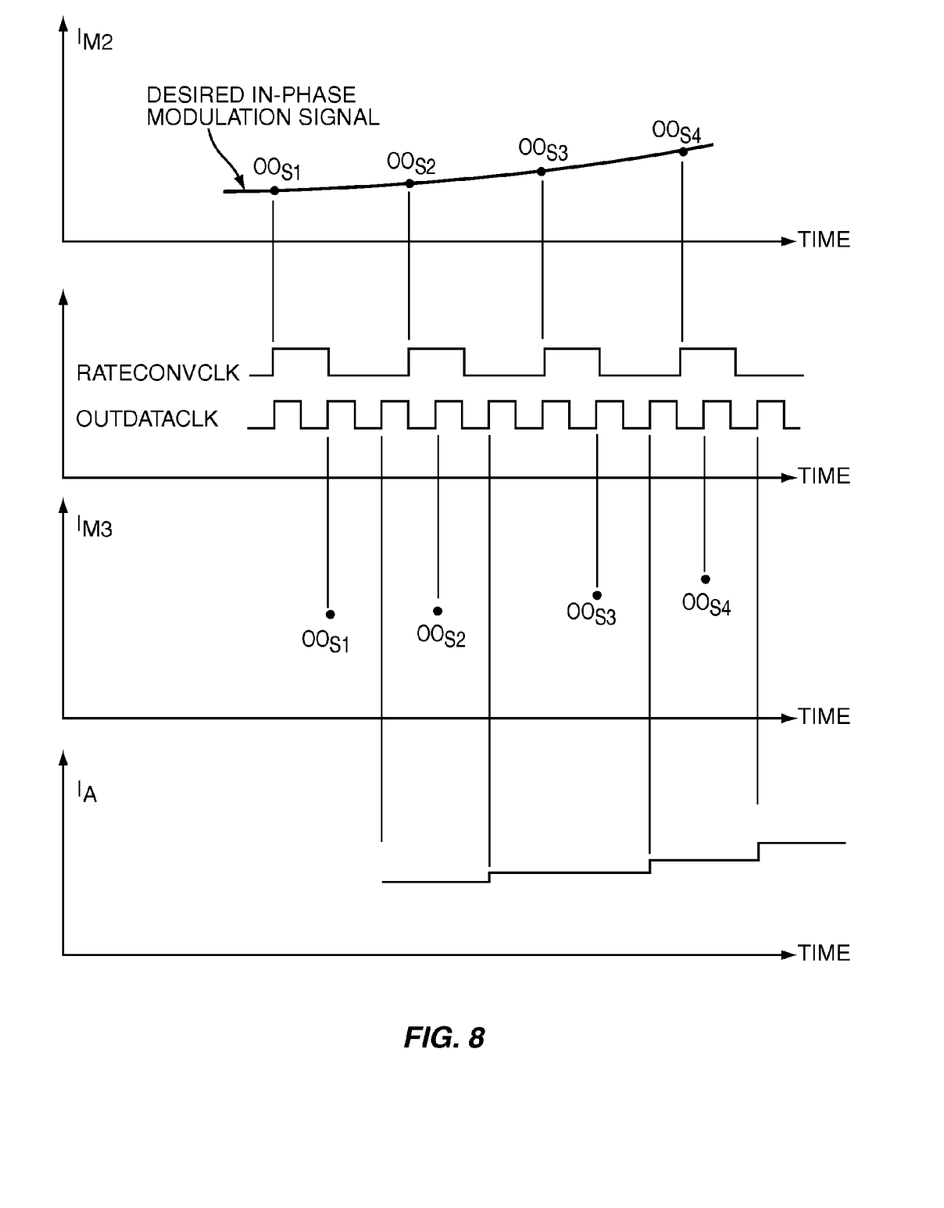
FIG. 8 shows how the fractional hold module of FIG. 7 is used to divide down the output data clock to create a slower rate conversion clock, and how the oversampled interpolated modulation data of FIG. 6 is held by the fractional hold module for alternating time periods.

FIG. 8 illustrates an exemplary embodiment of the present invention in which the fractional hold module 44 provides a rate converter clock RATECONVCLK that is ⅖ of the frequency of OUTDATACLK and the fractionally held digital in-phase modulation data $I_{M3}$ is held for alternating periods of two cycles of OUTDATACLK and three cycles of OUTDATACLK. The first graph of FIG. 8 shows oversampled output data samples $OO_{S1}$ through $OO_{S4}$ from the interpolation and timing control module 42, which are clocked-out with RATECONVCLK as shown in the second graph of FIG. 8. This graph also shows RATECONVCLK as ⅖ of the frequency of OUTDATACLK. The third graph of FIG. 8 shows oversampled output data samples $OO_{S1}$ through $OO_{S4}$ from the fractional hold module 44, which are held for alternating periods of two then three clock cycles of OUTDATACLK. $OO_{S1}$ is held for two clock cycles of OUTDATACLK. $OO_{S2}$ is held for three clock cycles of OUTDATACLK. $OO_{S3}$ is held for two clock cycles of OUTDATACLK, and so on. The fourth graph of FIG. 8 shows the impact of the alternating periods on the in-phase analog modulation signal $I_A$.

Careful selection of the rate converter clock RATECONVCLK frequency helps minimize the rate conversion period $T_{RC}$, which has the benefit of reducing the number of data samples that must be interpolated in a rate conversion period $T_{RC}$; therefore, when polynomial curve fitting is used, fewer interpolated output samples need to be created. A fractional hold period $T_{FH}$ is determined by the smallest whole number of $T_{OUTDATACLK}$ periods that are equal in time to a whole number of RATECONVCLK periods. Careful selection of the rate converter clock RATECONVCLK frequency helps minimize the fractional hold period $T_{FH}$, which has the benefit of increasing the frequency of fractional hold noise spurs, which need to be above the bandwidth of the modulation signals to be filtered out by the analog bandpass filter 34. In some embodiments of the present invention, the frequency of RATECONVCLK is not an integer sub-multiple of the frequency of OUTDATACLK.

Some embodiments of the present invention may use polynomial curve fitting as an interpolation method, which uses the input data samples to create polynomial coefficients and then uses the resulting polynomial to create the output data samples. For embodiments of the present invention using polynomial curve fitting as an interpolation method, FIR digital filtering may be integrated into the interpolation process to provide timing control and filter out noise from the modulation signals. For embodiments of the present invention using polynomial curve fitting with integral FIR digital filtering as an interpolation method, polynomials with variable coefficients may be used in the interpolation, timing control, and filtering process. If so, a different set of coefficients may be needed for each output data sample in a rate conversion period $T_{RC}$. In some embodiments of the present invention, the different sets of coefficients may be stored and retrieved from a look-up table (LUT). Due to the nature of FIR digital filter algorithms, some sections of the LUT may be duplicated or may be symmetrical images of other sections of the LUT. In some embodiments of the present invention, the symmetrical or duplicated sections of the LUT may be eliminated and replaced with a smaller LUT and circuitry to access the appropriate data from the LUT.

In an exemplary embodiment of the present invention, the frequency of INDATACLK is essentially 3.84 mega-hertz (Mhz). The frequency of OUTDATACLK is essentially 78 Mhz, which may be synthesized from a 26 Mhz system clock. The frequency of RATECONVCLK is essentially 31.2 Mhz, which is ⅖ of the frequency of OUTDATACLK. A fractional hold module 44 holds interpolated data for alternating periods of two and three clock cycles of OUTDATACLK. The rate conversion period $T_{RC}$ is 65 periods of the 31.2 Mhz RATECONVCLK, or approximately 2.08 micro-seconds (uS); therefore, 65 quadrature output data samples are used for each rate conversion period $T_{RC}$. The fractional hold period $T_{FH}$ is 5 periods of the 78 Mhz OUTDATACLK, or approximately 64.1 nano-seconds (nS), which is outside of the modulation signal bandwidth and will be filtered by the analog bandpass filter 34. Polynomial curve fitting with FIR digital filtering is used as an interpolation and timing control method. The FIR digital filtering requires polynomial coefficients for each quadrature output data sample. The polynomial coefficients are stored in an LUT. The LUT has been simplified to take advantage of symmetrical data.

The rate conversion module 40, interpolation and timing control module 42, and fractional hold module 44 are digital circuits, which may utilize application specific integrated circuit (ASIC) technology, digital signal processing (DSP) technology, or any other suitable digital technology. In some embodiments of the present invention, the rate conversion module 40 and the interpolation and timing control module 42 may be combined into a single digital circuit. In embodiments of the present invention using a fractional hold module 44, the rate conversion module 40, interpolation and timing control module 42, and fractional hold module 44 may be combined into one or more digital circuits.

Figure 9:
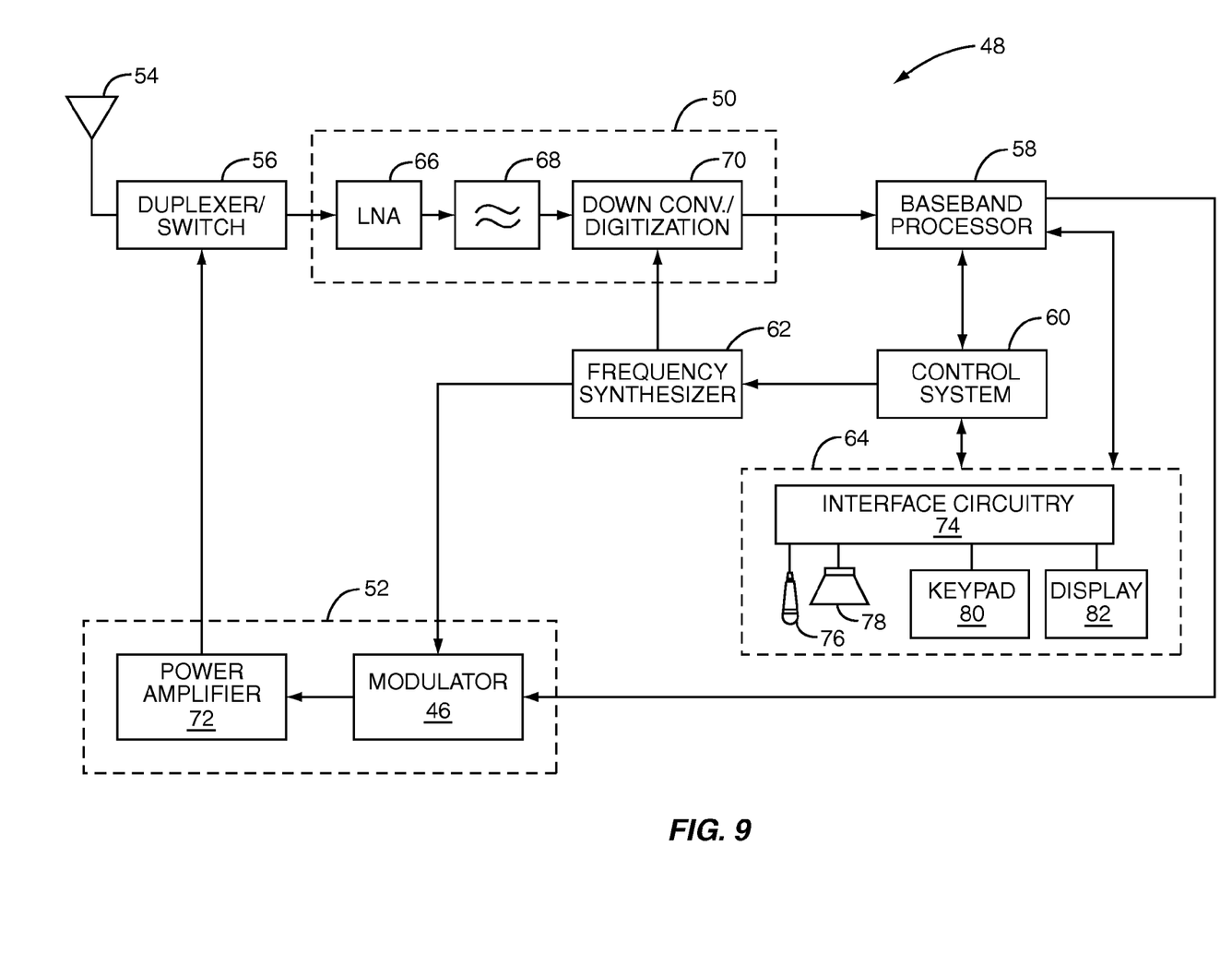
FIG. 9 shows how the present invention may be used in a mobile terminal.

An application example of an oversampled rate converted digital quadrature modulator 46 is its use in a mobile terminal 48. The basic architecture of the mobile terminal 48 is represented in FIG. 9 and may include a receiver front end 50, a radio frequency transmitter section 52, an antenna 54, a duplexer or switch 56, a baseband processor 58, a control system 60, a frequency synthesizer 62, and an interface 64. The receiver front end 50 receives information bearing radio frequency signals from one or more remote transmitters provided by a base station. A low noise amplifier (LNA) 66 amplifies the signal. A filter circuit 68 minimizes broadband interference in the received signal, while downconversion and digitization circuitry 70 downconverts the filtered, received signal to an intermediate or baseband frequency signal, which is then digitized into one or more digital streams. The receiver front end 50 typically uses one or more mixing frequencies generated by the frequency synthesizer 62. The baseband processor 58 processes the digitized received signal to extract the information or data bits conveyed in the received signal. This processing typically comprises demodulation, decoding, and error correction operations. As such, the baseband processor 58 is generally implemented in one or more digital signal processors (DSPs).

On the transmit side, the baseband processor 58 receives digitized data, which may represent voice, data, or control information, from the control system 60, which it encodes for transmission. The encoded data is output to the transmitter 52, where it is used by the oversampled rate converted digital quadrature modulator 46 to modulate a carrier signal that is at a desired transmit frequency. A power amplifier 72 amplifies the modulated carrier signal to a level appropriate for transmission, and delivers the amplified and modulated carrier signal to the antenna 54 through the duplexer or switch 56.

A user may interact with the mobile terminal 48 via the interface 64, which may include interface circuitry 74 associated with a microphone 76, a speaker 78, a keypad 80, and a display 82. The interface circuitry 74 typically includes analog-to-digital converters, digital-to-analog converters, amplifiers, and the like. Additionally, it may include a voice encoder/decoder, in which case it may communicate directly with the baseband processor 58. The microphone 76 will typically convert audio input, such as the user's voice, into an electrical signal, which is then digitized and passed directly or indirectly to the baseband processor 58. Audio information encoded in the received signal is recovered by the baseband processor 58, and converted by the interface circuitry 74 into an analog signal suitable for driving the speaker 78. The keypad 80 and display 82 enable the user to interact with the mobile terminal 48, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A digital modulation system comprising:
    an in-phase modulation data input adapted to receive in-phase input modulation data comprising in-phase input data samples and representing an in-phase modulation signal;
    a quadrature-phase modulation data input adapted to receive quadrature-phase input modulation data comprising quadrature-phase input data samples and representing a quadrature-phase modulation signal; and
    digital modulation circuitry adapted to:
        rate convert and interpolate the in-phase input modulation data to generate in-phase output modulation data comprising in-phase output data samples and representing the in-phase modulation signal; and
        rate convert and interpolate the quadrature-phase input modulation data to generate quadrature-phase output modulation data comprising quadrature-phase output data samples and representing the quadrature-phase modulation signal,
    wherein in a given time period a ratio of a number of in-phase output data samples to a number of in-phase input data samples is at least two to one, the in-phase modulation signal and the quadrature-phase modulation signal represent in-phase and quadrature-phase components of a complex modulation signal, and the in-phase input data samples and the quadrature-phase input data samples are collected in separate sets of input data samples, wherein each set of input data samples is processed using an interpolation method comprising polynomial curve fitting to create a set of output data samples, which is used to provide the in-phase output data samples and the quadrature-phase output data samples.

2. The digital modulation system of claim 1 further comprising:
    a digital rate converter circuit adapted to rate convert the in-phase input data samples and the quadrature-phase input data samples to provide the in-phase input data samples and the quadrature-phase input data samples synchronously to a rate converted sample clock; and
    a digital interpolation circuit adapted to receive the in-phase input data samples and the quadrature-phase input data samples synchronously with the rate converted sample clock and to interpolate the in-phase input data samples and the quadrature-phase input data samples to generate the in-phase output modulation data and the quadrature-phase output modulation data.

3. The digital modulation system of claim 1 wherein the polynomial curve fitting further comprises timing control.

4. The digital modulation system of claim 1 wherein the in-phase input data samples and the quadrature-phase input data samples are collected in separate sets of input data samples, wherein each set of input data samples is processed using an interpolation method comprising polynomial curve fitting, Finite Impulse Response (FIR) digital filtering, and timing control to create a set of output data samples, which is used to provide the in-phase output data samples and the quadrature-phase output data samples.

5. The digital modulation system of claim 4 wherein the polynomial curve fitting, FIR digital filtering, and timing control uses variable coefficient polynomials.

6. The digital modulation system of claim 5 further comprising at least one look-up table to store and retrieve values of coefficients for the variable coefficient polynomials.

7. A digital modulation system comprising:
    an in-phase modulation data input adapted to receive in-phase input modulation data comprising in-phase input data samples and representing an in-phase modulation signal;
    a quadrature-phase modulation data input adapted to receive quadrature-phase input modulation data comprising quadrature-phase input data samples and representing a quadrature-phase modulation signal; and
    digital modulation circuitry adapted to:
        rate convert and interpolate the in-phase input modulation data to generate in-phase output modulation data comprising in-phase output data samples and representing the in-phase modulation signal; and rate convert and interpolate the quadrature-phase input modulation data to generate quadrature-phase output modulation data comprising quadrature-phase output data samples and representing the quadrature-phase modulation signal, wherein the in-phase input data samples and the quadrature-phase input data samples are collected in separate sets of input data samples, wherein each set of input data samples is processed using an interpolation method comprising polynomial curve fitting, Finite Impulse Response (FIR) digital filtering, and timing control using variable coefficient polynomials to create a set of output data samples which is used to provide the in-phase output data samples and the quadrature-phase output data samples;

at least one look-up table to store and retrieve values of coefficients for the variable coefficient polynomials;

at least one look-up table that has been minimized in size by eliminating repeated or symmetrical sections; and look-up table steering circuitry to provide appropriate access to the at least one look-up table that has been minimized in size, wherein in a given time period, a ratio of a number of in-phase output data samples to a number of in-phase input data samples is at least two to one, and the in-phase modulation signal and the quadrature-phase modulation signal represent in-phase and quadrature-phase components of a complex modulation signal.

8. A digital modulation system comprising:

an in-phase modulation data input adapted to receive in-phase input modulation data comprising in-phase input data samples and representing an in-phase modulation signal;

a quadrature-phase modulation data input adapted to receive quadrature-phase input modulation data comprising quadrature-phase input data samples and representing a quadrature-phase modulation signal;

digital modulation circuitry adapted to:
rate convert and interpolate the in-phase input modulation data to generate in-phase output modulation data comprising in-phase output data samples and representing the in-phase modulation signal; and
rate convert and interpolate the quadrature-phase input modulation data to generate quadrature-phase output modulation data comprising quadrature-phase output data samples and representing the quadrature-phase modulation signal; and a fractional hold function adapted to:
receive a data hold clock signal;
provide a held in-phase output data sample for each in-phase output data sample wherein:
the value of the held in-phase output data sample is equal to the value of the in-phase output data sample; and
the held in-phase output data sample is provided for a number of cycles of the data hold clock signal determined by a current hold value; and
provide a held quadrature-phase output data sample for each quadrature-phase output data sample wherein:
the value of the held quadrature-phase output data sample is equal to the value of the quadrature-phase output data sample; and
the held quadrature-phase output data sample is provided for a number of cycles of the data hold clock signal determined by the current hold value, wherein in a given time period a ratio of a number of in-phase output data samples to a number of in-phase input data samples is at least two to one, the in-phase modulation signal and the quadrature-phase modulation signal represent in-phase and quadrature-phase components of a complex modulation signal and the current hold value alternates between a first fractional hold value and a second fractional hold value for each consecutive in-phase output data sample.

9. The digital modulation system of claim 8 further comprising a fractional hold circuit adapted to:
receive the data hold clock signal;
receive the in-phase output data samples and the quadrature-phase output data samples; and
provide the held in-phase output data samples and the held quadrature-phase output data samples.

10. The digital modulation system of claim 8 further comprising:
a digital rate converter circuit adapted to rate convert the in-phase input data samples and the quadrature-phase input data samples to provide the in-phase input data samples and the quadrature-phase input data samples synchronously to a rate converted sample clock;
a digital interpolation circuit adapted to receive the in-phase input data samples and the quadrature-phase input data samples synchronously with the rate converted sample clock and to interpolate the in-phase input data samples and the quadrature-phase input data samples to generate the in-phase output modulation data and the quadrature-phase output modulation data; and
a fractional hold circuit adapted to:
receive the data hold clock signal;
receive the in-phase output data samples and the quadrature-phase output data samples; and
provide the held in-phase output data samples and the held quadrature-phase output data samples.

11. The digital modulation system of claim 8 wherein the in-phase input data samples and the quadrature-phase input data samples are collected in separate sets of input data samples, wherein each set of input data samples is processed using an interpolation method to create a set of output data samples, which is used to provide the in-phase output data samples and the quadrature-phase output data samples.

12. The digital modulation system of claim 11 wherein the interpolation method further comprises polynomial curve fitting.

13. The digital modulation system of claim 11 wherein the interpolation method further comprises timing control.

14. The digital modulation system of claim 8 wherein the in-phase input data samples and the quadrature-phase input data samples are collected in separate sets of input data samples in which each set of input data samples is processed using an interpolation method comprising polynomial curve fitting, FIR digital filtering, and timing control to create a set of output data samples, which is used to provide in-phase output data samples and quadrature-phase output data samples.

15. The digital modulation system of claim 14 wherein the polynomial curve fitting, FIR digital filtering, and timing control uses variable coefficient polynomials.

16. The digital modulation system of claim 15 further comprising at least one look-up table to store and retrieve values of coefficients for the variable coefficient polynomials.

17. The digital modulation system of claim 16 further comprising:
at least one look-up table that has been minimized in size by eliminating repeated or symmetrical sections; and look-up table steering circuitry to provide appropriate access to the at least one look-up table that has been minimized in size.

18. The digital modulation system of claim 17 wherein:

a ratio of a number of in-phase output data samples to in-phase input data samples in a given time period is essentially 31.2/3.84;

a frequency of the data hold clock signal is essentially 78 Mhz;

a first fractional hold value is 2;

a second fractional hold value is 3; and the polynomial curve fitting further comprises $5^{th}$ order polynomials.

* * * * *